(12) United States Patent
Srinivasan

(10) Patent No.: US 11,682,137 B2
(45) Date of Patent: Jun. 20, 2023

(54) REFINING DEPTH FROM AN IMAGE

(71) Applicant: Zoox, Inc., Foster City, CA (US)

(72) Inventor: Praveen Srinivasan, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 0 days.

(21) Appl. No.: 17/851,481

(22) Filed: Jun. 28, 2022

(65) Prior Publication Data

US 2022/0327842 A1 Oct. 13, 2022

Related U.S. Application Data

(63) Continuation of application No. 16/452,304, filed on Jun. 25, 2019, now Pat. No. 11,386,671.

(51) Int. Cl.
| | |
|---|---|
| *G06T 7/50* | (2017.01) |
| *G06V 20/58* | (2022.01) |
| *G06V 20/56* | (2022.01) |
| *G06V 20/20* | (2022.01) |
| *G06T 7/73* | (2017.01) |
| *G06F 17/18* | (2006.01) |
| *G06N 20/00* | (2019.01) |
| *G06N 3/047* | (2023.01) |
| *G06F 18/24* | (2023.01) |

(52) U.S. Cl.
CPC ............... *G06T 7/73* (2017.01); *G06F 17/18* (2013.01); *G06F 18/24* (2023.01); *G06N 3/047* (2023.01); *G06N 20/00* (2019.01); *G06T 7/50* (2017.01); *G06V 20/20* (2022.01); *G06V 20/58* (2022.01); *G06V 20/588* (2022.01)

(58) Field of Classification Search
CPC ........... G06K 9/00805; G06K 9/00798; G06K 9/6267; G06T 7/50; G06N 20/00; G06N 3/0472; G06F 17/18
See application file for complete search history.

(56) References Cited

U.S. PATENT DOCUMENTS

| 6,901,389 B1 | 5/2005 | Madison et al. |
| 2016/0203525 A1 | 7/2016 | Hara et al. |

(Continued)

OTHER PUBLICATIONS

Non Final Office Action dated Oct. 28, 2020 for U.S. Appl. No. 16/452,304, "Refining Depth From an Image", Srinivasan, 13 pages.

(Continued)

*Primary Examiner* — Umair Ahsan
(74) *Attorney, Agent, or Firm* — Lee & Hayes, P.C.

(57) ABSTRACT

Depth estimates for an object made by one or more sensors of a vehicle may be refined using locations of environmental attributes that are proximate the object. An image captured of the object proximate an environmental attribute may be analyzed to determine where the object is positioned relative to the environmental attribute. A machine-learned model may be used to detect the environmental attribute, and a location of the environmental attribute may be determined from map data. A probability of a location of the object may be determined based on the known location of the environmental attribute. The location probability of the object may be used to refine depth estimates generated by other means, such as a monocular depth estimation from an image using computer vision.

20 Claims, 8 Drawing Sheets

(56) References Cited

U.S. PATENT DOCUMENTS

| | | |
|---|---|---|
| 2016/0350930 A1* | 12/2016 | Lin .................. G06N 20/10 |
| 2017/0243070 A1* | 8/2017 | Janssen .................. G06T 7/73 |
| 2019/0056498 A1* | 2/2019 | Sonn .................. G01S 17/931 |
| 2020/0160709 A1 | 5/2020 | Ramot et al. |
| 2020/0334843 A1 | 10/2020 | Kasuya et al. |
| 2020/0410259 A1 | 12/2020 | Srinivasan |

OTHER PUBLICATIONS

Office Action for U.S. Appl. No. 16/452,304, dated Jun. 8, 2021, Srinivasan, "Refining Depth From an Image", 15 pages.
Office Action for U.S. Appl. No. 16/452,304, dated Sep. 16, 2021, Srinivasan, "Refining Depth From an Image", 20 pages.
The International Preliminary Report on Patentability for PCT Application No. PCT/US20/39633, dated Jan. 6, 2022.
The International Preliminary Report on Patentability for PCT Application No. PCT/US20/39633, dated Dec. 28, 2021.
The PCT Search Report and Written Opinion dated Sep. 17, 2020 for PCT Application No. PCT/US20/39633, 10 pages.

* cited by examiner

REFINING DEPTH FROM AN IMAGE

RELATED APPLICATIONS

This application claims priority to and is a continuation of U.S. patent application Ser. No. 16/452,304, filed on Jun. 25, 2019, which will issue as U.S. Pat. No. 11,386,671 on Jul. 12, 2022, the entire contents of which are incorporated herein by reference.

BACKGROUND

Various methods, apparatuses, and systems are utilized to guide autonomous vehicles through environments including various static and dynamic objects. For instance, autonomous vehicles utilize route planning methods, apparatuses, and systems to guide autonomous vehicles through congested areas with other moving and stationary vehicles (autonomous or otherwise), people, buildings, and other objects. In some examples, an autonomous vehicle may make decisions while traversing an environment to ensure safety for passengers and surrounding persons and objects. A variety of sensors may be used to collect information about objects in the surrounding environment, which may be used by the autonomous vehicle to make decisions on how to traverse the environment. Accurately predicting depths of objects (e.g., distances of objects from the autonomous vehicle) in the environment may, at times, present challenges.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features, in accordance with examples of the disclosure.

DETAILED DESCRIPTION

Figure 1:
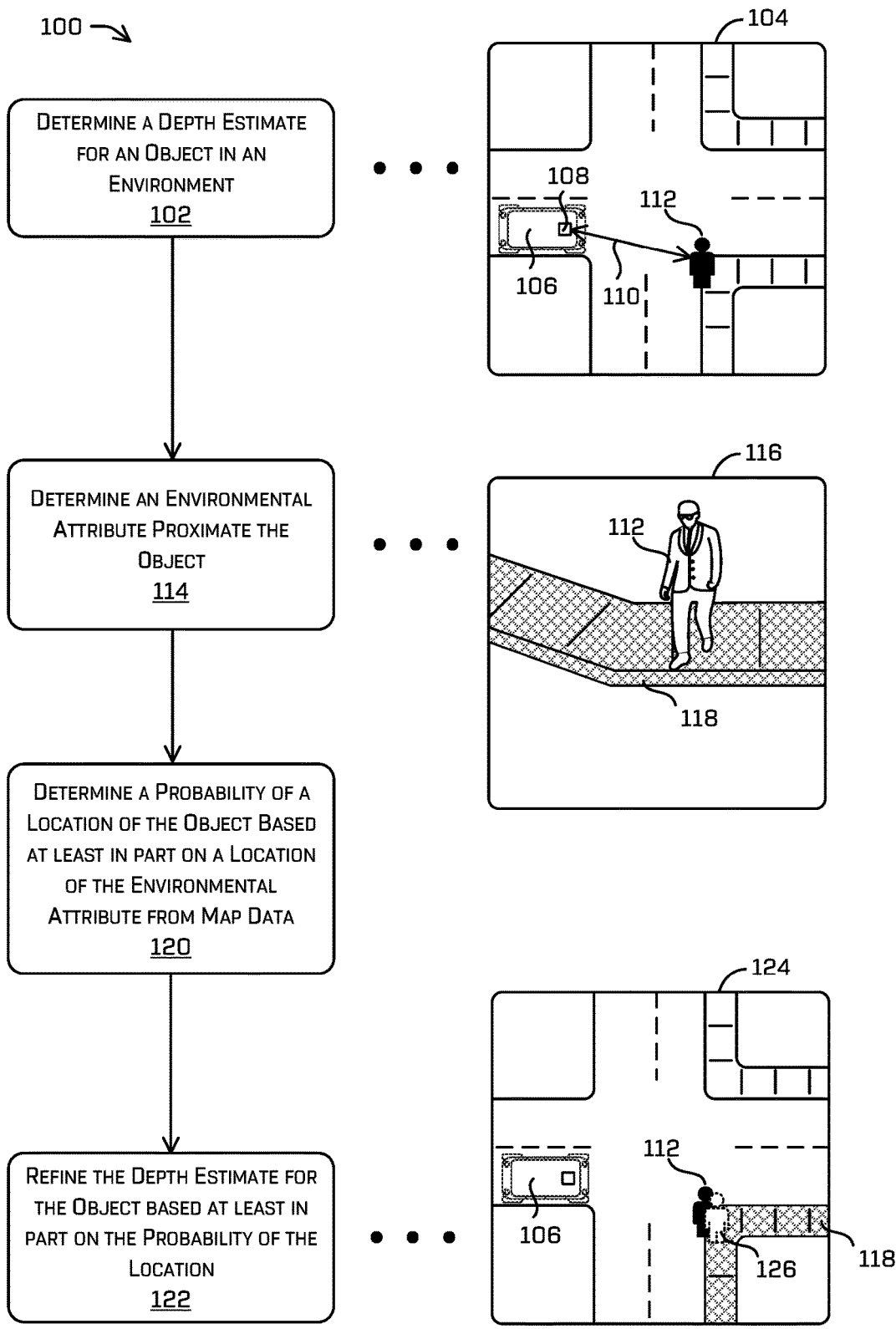
FIG. 1 is a pictorial flow diagram of using an environmental attribute to refine a depth estimate of an object from a vehicle, in accordance with examples of the disclosure.

This disclosure relates to techniques for accurately determining a depth of an object in an environment by taking into account one or more other attributes in the environment. In some examples, the techniques can include refining an initial depth estimate for an object made by one or more sensors (e.g., of a vehicle an autonomous vehicle) using locations of environmental attributes that are proximate the object. In some examples, an environmental attribute is a feature that generally remains in a same location in the environment, where the location of the environmental attribute is known (e.g., stored in map data of the environment). Examples of environmental attributes may include features such as sidewalks, crosswalks, bike lanes, lane markers on a drivable surface, signs, fences, grass or other ground cover material, for instance.

An image captured of the object proximate an environmental attribute may be analyzed to determine where the object is positioned relative to the environmental attribute (e.g., on top of, behind, in front of, next to, etc.). The position of the object relative to the environmental attribute may then be used to refine a depth estimate of the object as determined by, for example, a monocular depth estimate corresponding to individual pixels of the image (e.g., using a machine-learned model). In some cases, a depth estimate for the object made using data generated from a single image may have inaccuracies for a variety of reasons, such as measurement accuracy decreasing (an uncertainty increasing) further away from the camera that captured the image. Even small depth inaccuracies (e.g., several inches or centimeters) may be the difference between a pedestrian in a sidewalk or in a street, a child in front of or behind a chain-link fence, a bicyclist in a bike lane or in a lane of traffic, and so forth. Therefore, additional mechanisms for refining depth estimates, such as the techniques described herein using environmental attributes, improve safety of autonomous vehicles in a number of different scenarios.

Sensor data captured by the autonomous vehicle can include data captured by a camera sensor, such as individual images, video, and the like, as well as data captured by other sensors such as lidar sensors, radar sensors, time-of-flight sensors, sonar sensors, and the like. In some cases, the sensor data can be provided to a perception system configured to determine or classify a type of an object (e.g., vehicle, pedestrian, bicycle, motorcycle, animal, parked car, tree, building, and the like) in the environment. Additionally, in some examples, the sensor data, such as images, may be used to determine depths of objects in the environment surrounding a vehicle, e.g., a distance from the vehicle to various objects in the environment.

The sensor data may be captured by the autonomous vehicle as the autonomous vehicle traverses an environment. In some examples, the autonomous vehicle may include, among other sensors, one or more cameras configured to capture images (e.g., individual images and/or video) of the surrounding environment. Images captured by the one or more cameras may be analyzed to detect objects, either independently of or in conjunction with the detection of the objects by the other sensors of the vehicle. Once detected, in some examples, the images may be cropped to an area of interest surrounding the objects, e.g., based on size (centimeters, pixels, etc.) surrounding individual objects, based on a bounding box surrounding the object, and so forth. Objects detected in the images captured by the camera may be dynamic objects, such as pedestrians, bicyclists, vehicles, and so forth, that generally do not remain stationary long enough to be incorporated into map data of the environment. In some examples, an initial depth prediction of the object from the autonomous vehicle may be determined by inputting an image of the object into a machine-learned model, such as a deep neural network, trained to predict depths of surfaces depicted or represented in individual pixels of the image. Alternatively or additionally, sensor data from one or more modalities may be combined using data fusion techniques such as a Kalman filter and/or a deep neural network to determine an initial depth prediction of the object from the autonomous vehicle. However, examples are considered in which determination of the initial depth predictions from surfaces depicted in the image may be omitted, and the depth estimate may be based on comparison of a position of the object to an environmental attribute as described below. Alternatively or additionally, a single machine-learned model may be configured to determine a single depth estimate from both surfaces depicted in the image, along with relative position of the object to an environmental attribute, in a single operation in some examples.

An attribute identifier component of the autonomous vehicle may determine an environmental attribute proximate the object depicted in the image (and/or depicted in the cropped portion of the image). The attribute identifier component, in some cases, may determine the environmental attribute by semantically segmenting the image to label pixels of the image that are associated with a label for the environmental attribute. An environmental attribute may be considered to be "proximate" the object if the environmental attribute intersects the object as depicted in the image, or is within a threshold distance (e.g., a number of pixels, a number of centimeters, etc.). In some cases, a machine-learned model may be trained to classify environmental attributes such as sidewalks, crosswalks, bike lanes, fences, and so on which are depicted in images input into the machine-learned model. For instance, the machine-learned model may output environmental attributes that are proximate the object depicted in the image, and/or may provide a relative location of the object to the environmental attribute (e.g., on top of, behind, in front of, next to, etc.). The relative location of the object to the environmental attribute may be represented as a vector, as coordinates, or other mechanism of conveying relative positions between entities when output by the machine-learned model.

A location determination component of the autonomous vehicle may determine a location of the environmental attribute from map data. In some examples, the location determination component may have access to one or more maps that include various environmental attributes, such as roads, sidewalks, buildings, signs, crosswalks, and so forth. The location determination component may associate the environmental attribute received from the machine-learned model with an environmental attribute included in the map data. In some examples, the location determination component may determine a probability of a location of the object based on the location of the environmental attribute in the map data. For instance, the location determination component may receive an indication from the machine learned model that a bicycle (e.g., the object) is behind a lane marker (e.g., the environmental attribute). Based on the location of the lane marker on a map, the location determination component may determine that the bicycle is in a bicycle lane behind the lane marker relative to the vehicle, as opposed to in a lane of traffic in front of the lane marker relative to the vehicle.

In examples, the location determination component refines the depth estimate for the object based on the probability of the location of the object, e.g., relative to the environmental attribute. For instance, the vehicle may utilize a known location of the vehicle (e.g., determined from a system such as simultaneous localization and mapping (SLAM)) and the location of the environmental attribute from the map data to update the depth estimate for the object. Continuing with the above example, the vehicle may determine an initial depth estimate for the bicycle of 9 meters, using a three-dimensional point cloud to predict depths of surfaces from the vehicle. If the vehicle determines the environmental attribute of the lane marker to be a distance of 9.5 meters away from the vehicle, the vehicle may refine the depth estimate of the bicycle to 10 meters from the vehicle, knowing that the bicycle is behind the lane marker.

The techniques discussed herein can improve a functioning of a computing device in a number of ways. As mentioned above, the attribute identifier component may use as few a single image (or a cropped portion of a single image) to make reliable depth estimates of objects in the environment surrounding a vehicle. Consequently, significantly less processing resources are used in comparison to conventional techniques that require complex image analysis algorithms applied to images captured by multiple cameras and/or other sensors to determine depth of an object. Since the depth determination can be made from an image from a single camera, the location determination component may be able to determine depths for more objects in the environment than would be possible if images from multiple cameras were required. In some cases, as described above, the described techniques are more accurate than other depth measurement mechanisms. For example, depth estimates from a monocular image may have limited range, decreasing in accuracy as surfaces become farther away from the camera used to capture the image. These estimates may be improved by refining the initial depth estimate for an object based on relative locations of the object to known locations of environmental attributes proximate the object as described herein. In an example that utilizes data fusion to estimate depth of an object, the initial depth estimate and the refined depth estimate may be used as constraints and/or costs to estimate the depth. By controlling the vehicle based in part on depth of objects determined from image data, the safety of the vehicle can be improved by determining object depths faster and earlier, thus allowing the vehicle to make trajectory decisions earlier. Additionally, as just described, controlling the vehicle based in part on determining object depth from images can reduce processing resources, with as few as a single image being evaluated by the processing resources at one time during the depth determination. Further, techniques for controlling the vehicle based in part on determining object depth from images using environmental attributes can increase a confidence that the vehicle can avoid collisions with oncoming traffic and/or pedestrians by determining the depths earlier and with greater accuracy, which may improve safety outcomes, performance, and/or accuracy. These and other improvements to the functioning of the computer are discussed herein.

The techniques described herein can be implemented in a number of ways. Example implementations are provided below with reference to the following figures. Although discussed in the context of an autonomous vehicle, the methods, apparatuses, and systems described herein can be applied to a variety of systems (e.g., a sensor system or a robotic platform), and are not limited to autonomous vehicles. In one example, the techniques described herein may be utilized in driver-controlled vehicles in which such a system may provide an indication to a driver of the vehicle of whether it is safe to perform various maneuvers. In another example, the techniques can be utilized in an aviation or nautical context, or in any system involving objects or entities that may be associated with behavior that is unknown to the system. Such techniques may also be used, for example, in the context of manufacturing and assembly to inspect components as they move down an assembly line. Additionally, the techniques described herein can be used with real data (e.g., captured using sensor(s)), simulated data (e.g., generated by a simulator), or any combination of the two.

FIG. 1 is a pictorial flow diagram 100 of using an environmental attribute to refine a depth estimate of an object from a vehicle, in accordance with examples of the disclosure.

An operation 102 includes determining a depth estimate for an object in an environment. The depth estimate may be determined by inputting an image of the object into a deep neural network or other machine-learned model configured to predict depths of surfaces depicted in the image at individual pixels of the image. For instance, an example 104 includes a vehicle 106 having a sensor 108 which may be configured to capture information of the surrounding environment. In some examples, the vehicle 106 may determine a depth 110 of an object 112 from the vehicle 106 based on data captured by the sensor 108. For instance, the sensor 108 may be a camera which captures an image of the environment surrounding the vehicle 106 depicting the object 112. The vehicle 106 may unproject a ray from the image onto a three-dimensional surface mesh of the environment, which can be used as an estimate for the projected location of the object 112. The vehicle 106 may use the projected location of the object 112 to determine an initial depth estimate for the object 112 from the vehicle 106, such as based on a known location of the vehicle 106 using a system such as SLAM.

An operation 114 includes determining an environmental attribute proximate the object. In some examples, the environmental attribute may be determined from an image captured by the sensor 108 of the vehicle 106, where the image depicts the object 112 and at least a portion of the environment surrounding the object 112. For instance, consider an example image 116 depicting the object 112 as captured by the sensor 108 of the vehicle 106. The image 116 may be as captured by the sensor 108, or in some cases may be a cropped portion of an image to an area surrounding the object 112, e.g., based on a predefined overall size and/or a predefined border size surrounding the object 112.

In examples, an environmental attribute 118 proximate the object 112 may be determined by inputting the image 116 into a machine-learned model trained to identify different environmental attributes. For instance, the machine-learned model may be trained as a classifier to detect environmental attributes such as sidewalks, bicycle lanes, traffic lanes, crosswalks, and so forth. In some cases, the machine-learned model may be trained to classify different environmental attributes according to a type of object depicted in an input image such as the image 116. For example, if the object depicted in the input image is a pedestrian, the machine-learned model may classify the environmental attributes into one or more classifications relevant to pedestrians, such as a first sidewalk parallel to a direction of travel of the vehicle 106, a second sidewalk perpendicular to a direction of travel of the vehicle 106, a crosswalk (e.g., parallel or perpendicular to the direction of travel of the vehicle), a particular lane of traffic, and so forth. In another example, if the object depicted in the input image is another vehicle, the machine-learned model may classify the environmental attributes into one or more classifications relevant to vehicles, such as a lane of oncoming traffic relative to the vehicle 106, a lane of traffic shared by the vehicle 106 and the other vehicle, a lane of traffic traveling in a same direction as the vehicle 106 (although not necessarily shared with the vehicle 106), a parking space, or a driveway, to name a few examples. In at least some examples, contextual portions stored in a map (e.g., the location and extents of the environmental attribute 118) may be projected into the image 116, with associated depth information. Such depth information may then be associated (as further defined herein) with the object 112 to refine the estimate. If the object depicted in the input image is a two-wheeled vehicle such as a bicycle, motorcycle, scooter, and so forth, the machine-learned model may classify the environmental attributes into one or more classifications relevant to two-wheeled vehicles, such as a bicycle lane, a sidewalk, or a lane of traffic, for instance. Of course, these examples of environmental attributes are non-limiting, and any environmental attribute may be used by the machine-learned model as a classification.

The machine-learned model may output the environmental attribute 118, and in some cases may also output a location of the object 112 relative to the environmental attribute 118. For instance, the machine-learned model may output an indication that the object 112 is on top of the environmental attribute 118 and/or behind a portion of the environmental attribute 118. In this example, the object 112 is a pedestrian, and the environmental attribute 118 is a sidewalk, where the pedestrian is on top of the sidewalk and behind a curb or edge of the sidewalk, as opposed to being in front of the sidewalk (e.g., in the street). Such information regarding the position of the object 112 relative to the environmental attribute 118 may significantly improve depth estimates, without the need for multiple images from different cameras to detect depth, when leveraged with map data of the environment as will be described.

For instance, an operation 120 includes determining a probability of a location of the object based at least in part on a location of the environmental attribute from map data. The vehicle 106 may have access to one or more maps of the surrounding environment, which may provide a location of the environmental attribute 118 as part of the map data. Having received the indication of the environmental attribute 118 from the machine-learned model, the vehicle 106 may leverage the map data to determine a likely location of the object 112 based on the proximity of the object 112 to the environmental attribute 118. Further, the probability of the location of the object 112 may be increased with the location of the object 112 relative to the environmental attribute 118 being output by the machine-learned model as just described (e.g., the object 112 being in front of, behind, on top of, under, to the left of, to the right of, etc. of the environmental attribute 118). Thus, the probability of the location of the object 112 may correspond to a location of the object 112 in the environment based on the map data.

An operation 122 includes refining the depth estimate for the object based at least in part on the probability of the location. For instance, an example 124 depicts the vehicle 106, along with the object 112 at a position based on the first depth estimate, and an object 126 which corresponds to the object 112 at a position based on the refined depth estimate (or refined distance estimate). The example 124 depicts how the depth estimate of the object 112 has been refined based on the location of the object 112 relative to the environmental attribute 118. In some examples, refining a depth estimate may comprise using a second depth estimate determined from the location probability of the object, e.g., replacing the first depth estimate with the second depth estimate. However, in some cases, the first depth estimate and the second depth estimate may be combined (e.g., based on a weighted average), a likelihood for the first depth estimate and a likelihood of the second depth estimate may be compared to select the first or second depth estimates as at a final depth estimate, and so forth. Other techniques for refining the depth estimate are considered, as is discussed in relation to FIG. 6. The vehicle 106 may be controlled based on the refined depth estimate determined at operation 122, such as to select a trajectory to follow based on the refined depth estimate of the object 126 from the vehicle 106.

Figure 2:
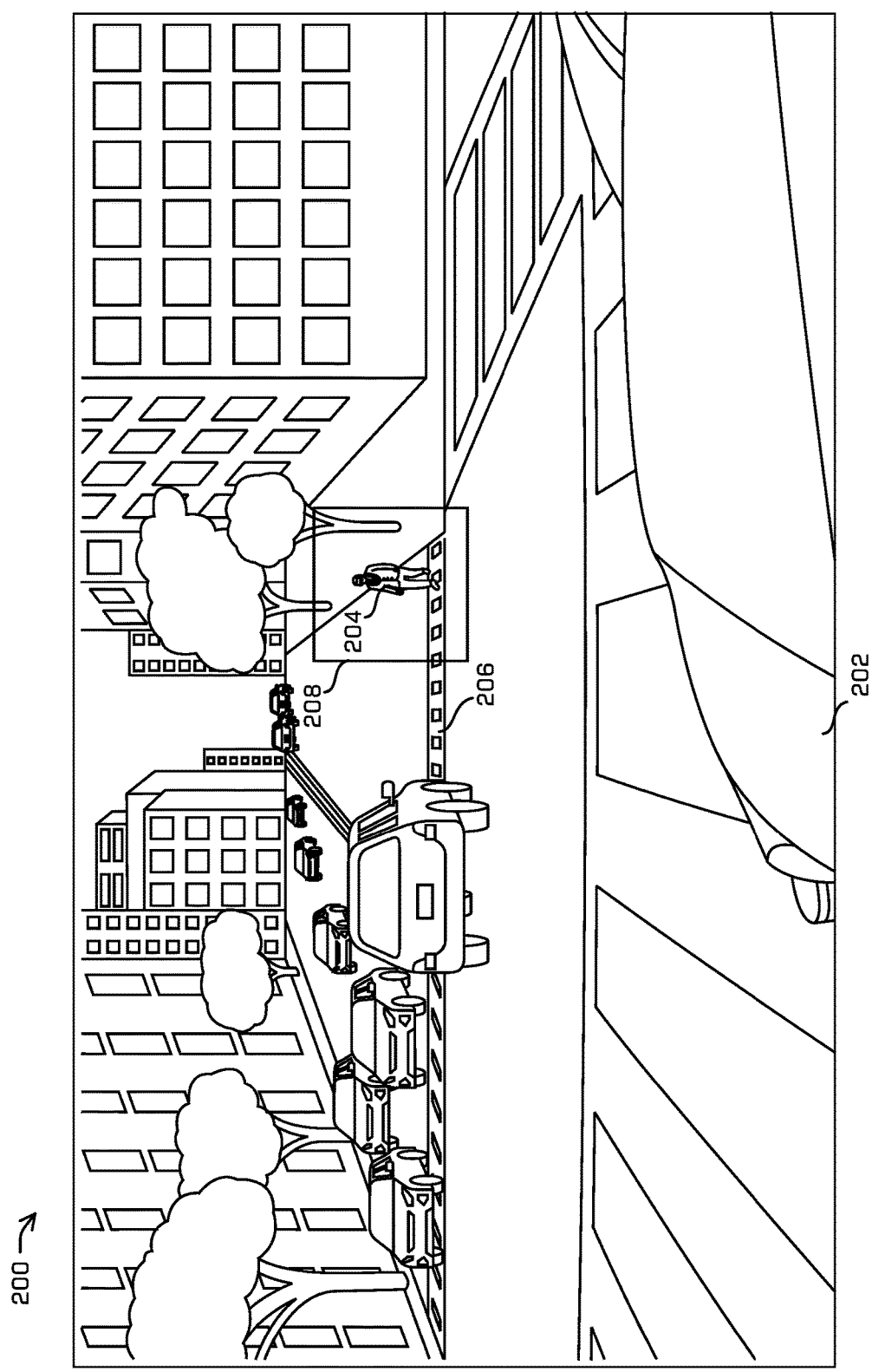
FIG. 2 is an illustration of an object detected in an environment for which a vehicle may determine and refine a depth estimate, in accordance with examples of the disclosure.

FIG. 2 is an example image 200 of an object detected in an environment which a vehicle may determine, and refine, a depth estimate for, in accordance with examples of the disclosure. For example, the example image 200 may be an image captured by a sensor of a vehicle 202, such as a camera, as the vehicle 202 traverses an environment.

The example image 200 may include a variety of objects throughout the environment, such as an object 204, and a crosswalk 206. In some examples, the vehicle 202 may want to determine a depth of the object 204 to further determine how to traverse portions of the environment, such as the junction depicted in front of the vehicle 202. For instance, if the object 204 is on the sidewalk, the vehicle 202 may decide to proceed through the junction, but if the object 204 is in the crosswalk 206, then the vehicle 202 may decide to stop and maintain its current position without entering the junction, e.g., to avoid obstructing traffic traveling in a perpendicular direction through the junction. In some examples, the vehicle 202 may generate a crop 208 of the example image 200, which may be input into a machine-learned model to determine environmental attributes proximate the object 204. In this way, processing resources may be conserved by not analyzing the entire image, but rather portions of the image having environmental attributes relevant to the position of the object 204.

Figure 3:
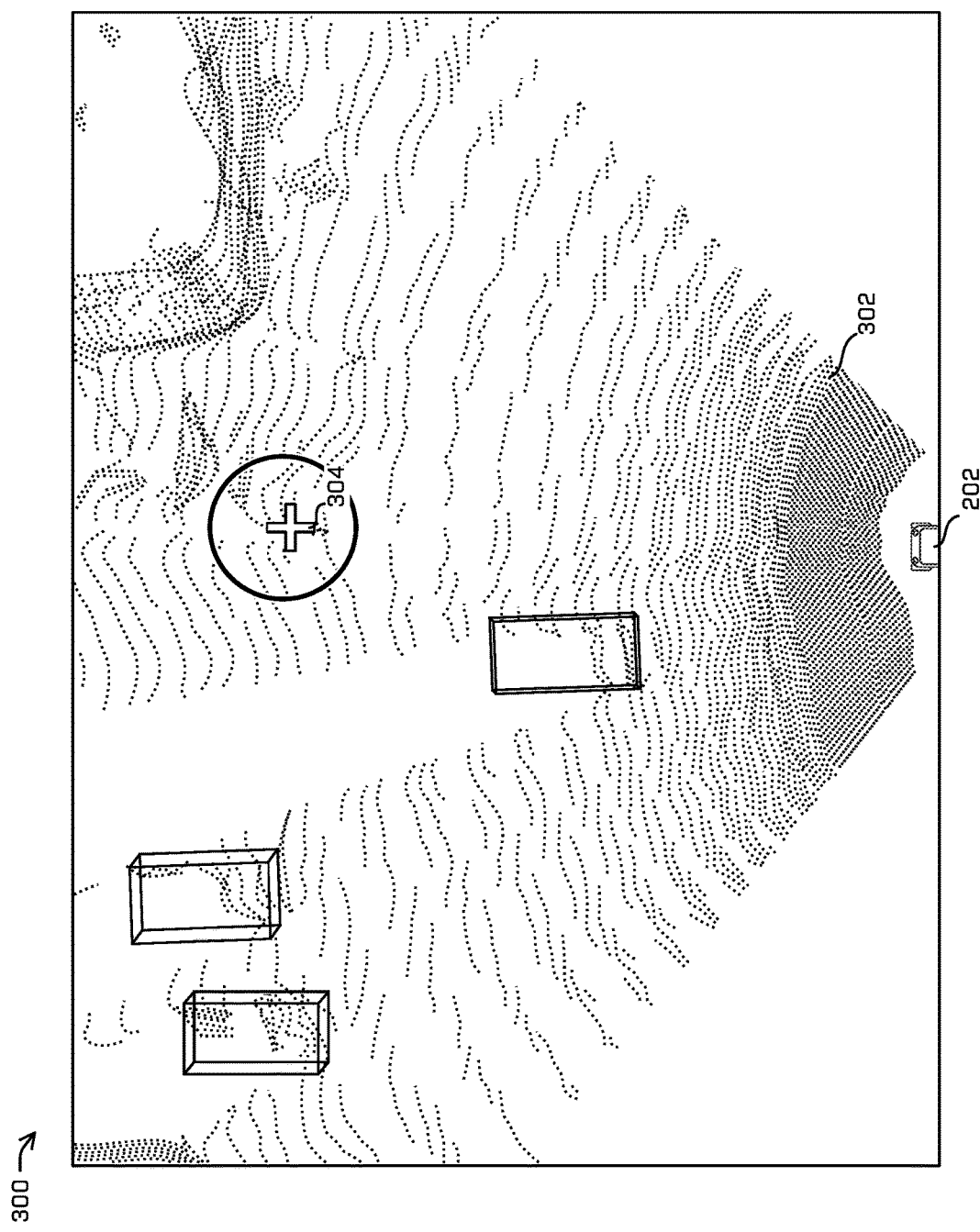
FIG. 3 is an illustration of a three-dimensional point cloud including the object in the environment illustrated in FIG. 2, and a depth estimate of the object in the environment, in accordance with examples of the disclosure.

FIG. 3 is an illustration 300 of a three-dimensional point cloud including the object in the environment illustrated in FIG. 2, and a depth estimate of the object in the environment, in accordance with examples of the disclosure.

For example, the example image 200 may be input into a machine-learned model, such as a deep neural network or other type of machine-learned model trained to predict depths of surfaces depicted in images for individual ones of the pixels in the images. In some examples, the machine-learned model may output a three-dimensional point cloud 302 corresponding to the predicted depths at individual pixels in an input image. The illustration 300 provides a two-dimensional, top-down view of the point cloud corresponding to the example image 200.

For instance, an indicator 304 indicates a depth estimate of the object 204 depicted in the example image 200 from the vehicle 202, as generated from the three-dimensional point cloud 302. In some examples, the probability of the object 204 being at the exact location of the indicator 304 may relatively low, e.g., based on the distance of the object 204 from the camera used to capture the example image 200 on the vehicle 202. Therefore, to improve the depth estimate for the object 204, a known location of an environmental attribute may be leveraged to refine the depth estimate and increase accuracy.

Figure 4:
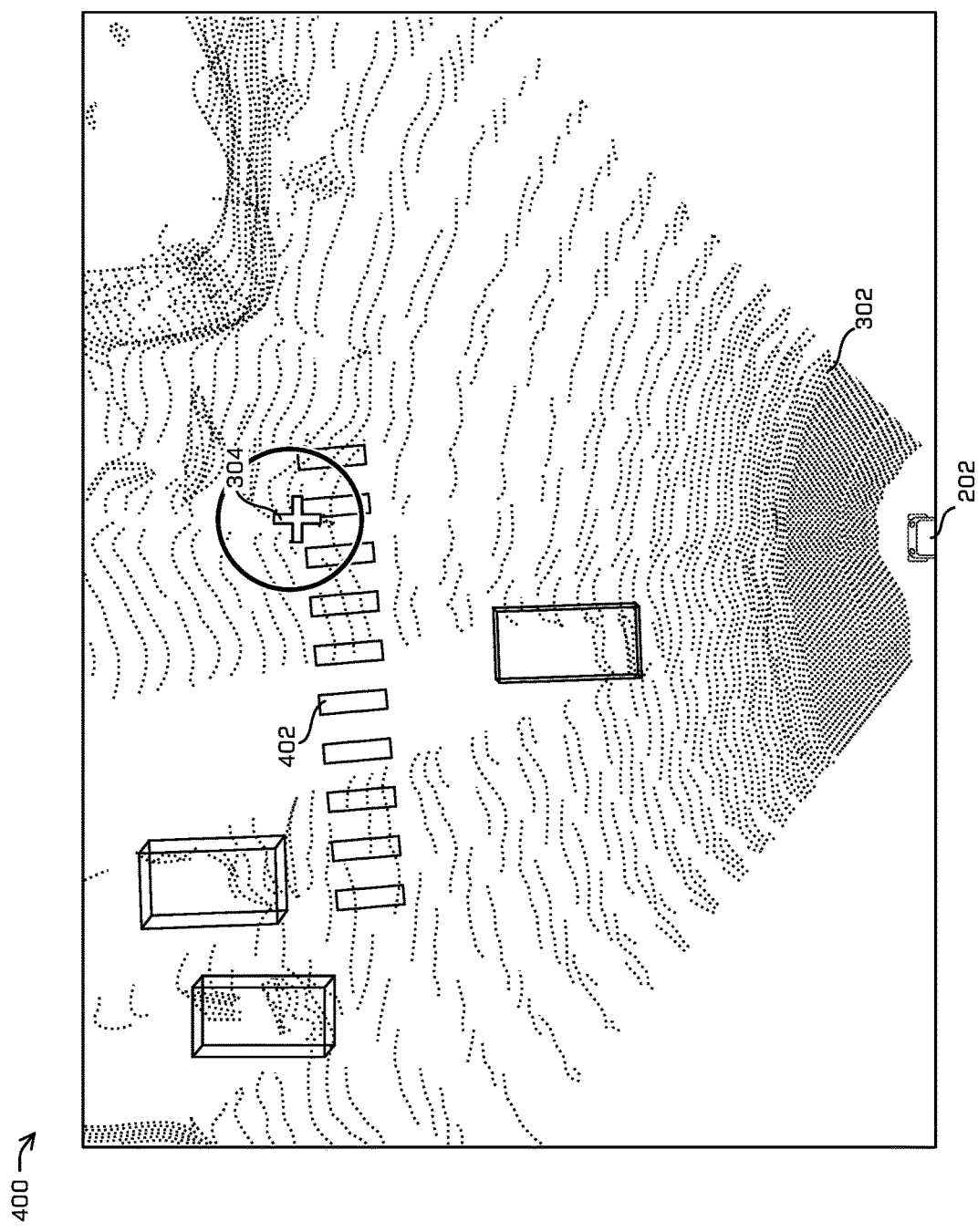
FIG. 4 is an illustration of the three-dimensional point cloud of FIG. 3, further depicting a location of an environmental attribute, in accordance with examples of the disclosure.

For example, consider FIG. 4, an illustration 400 of the three-dimensional point cloud 302 of FIG. 3, further depicting a location of an environmental attribute, in accordance with examples of the disclosure. The illustration 400 includes an environmental attribute 402, which may correspond to the crosswalk 206 of FIG. 2. In examples, as described herein, a machine-learned model may be used to identify the crosswalk as an environmental attribute proximate the object 204 from the crop 208. For instance, the machine-learned model may associate the object 204 with the attribute in image space to determine a relative location of the object 204 to the environmental attribute. The vehicle 202 may obtain map data that includes a known location of the crosswalk 206, which may be used to determine the location of the environmental attribute 402 relative to the three-dimensional point cloud 302. As shown, the depth estimate of the object 204 based on the three-dimensional point cloud 302 places the indicator 304 at a position just behind the environmental attribute 402. In other words, the depth estimate of the object 204 based on the three-dimensional point cloud 302 indicates that the object 204 is behind the crosswalk 206, and in a lane of traffic.

Figure 5:
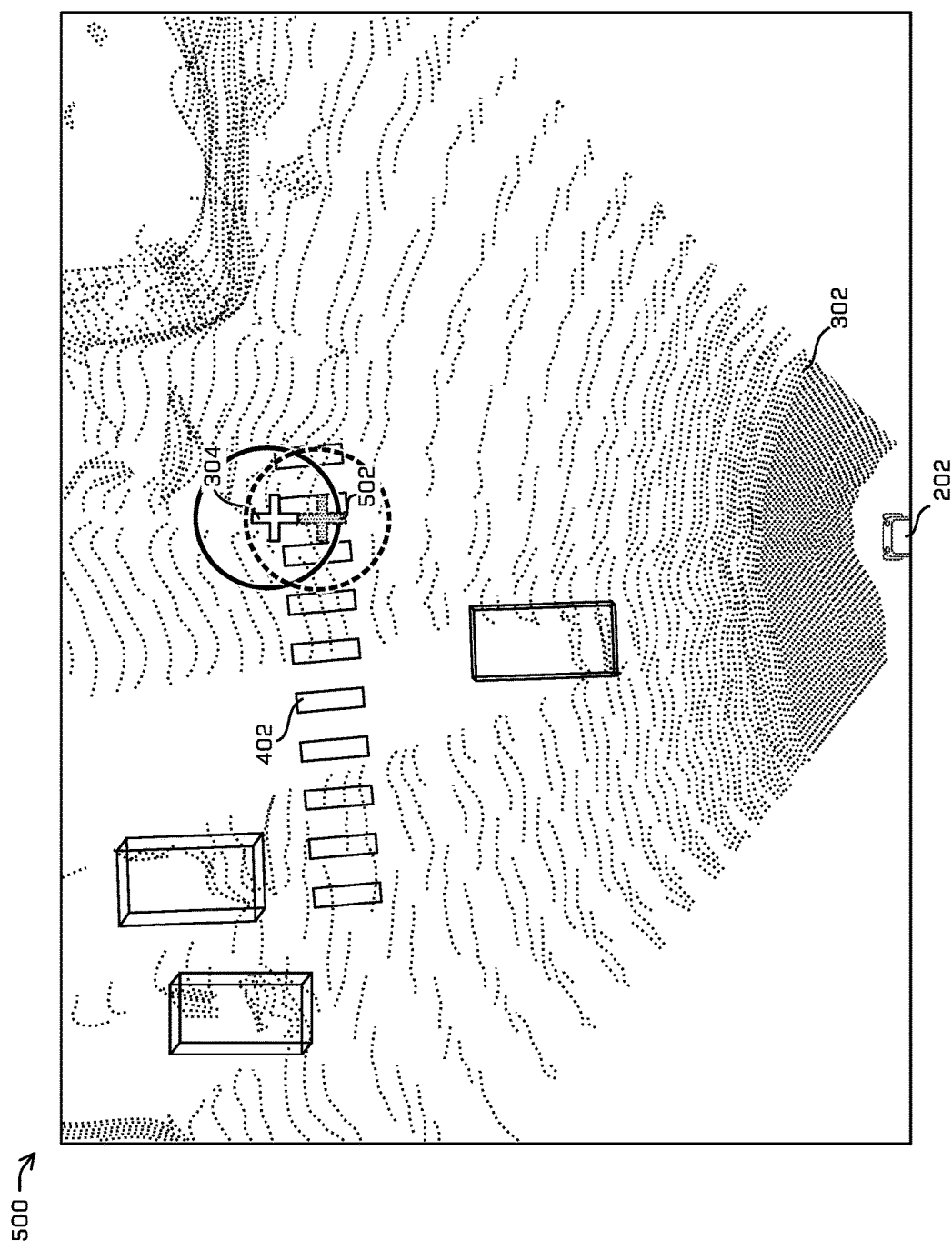
FIG. 5 is an illustration of the three-dimensional point cloud of FIG. 3, further depicting a refined depth estimate of the object based on the location of the environmental attribute, in accordance with examples of the disclosure.

However, consider FIG. 5, an illustration 500 of the three-dimensional point cloud 302 of FIG. 3, further depicting a refined depth estimate of the object based on the location of the environmental attribute 402, in accordance with examples of the disclosure. As described herein, a location of the object 204 may be determined relative to the crosswalk 206, e.g., based on how the object 204 and the crosswalk 206 are depicted in the crop 208. For example, the machine-learned model may output an indication that the object 204 is in the crosswalk 206 based on the crop 208, rather than in front of the crosswalk 206, behind the crosswalk 206, and so forth. Because the vehicle 202 has access to map data indicating the location of the environmental attribute 402, the vehicle 202 can determine a probability of a location of the object 204 based on the known location of the environmental attribute 402 (e.g., the crosswalk 206) and the location of the object 204 relative to the environmental attribute 402 (e.g., "in" the crosswalk 206). Therefore, the vehicle 202 may update the depth estimate from the indicator 304 to the indicator 502 "in" the environmental attribute 402, which corresponds to the object 204 being "in" the crosswalk 206.

While the example described in relation to FIGS. 3, 4, and 5 includes a pedestrian in a crosswalk, other examples of leveraging relative locations are also considered. In some examples, the relative location of the object 204 to the environmental attribute 402 may further take into account additional environmental attributes such as a ground plane, drivable surface, and/or an edge or intersection of the object 204 with the environmental attribute 402. For instance, of the edge of the crosswalk 206 intersects the object 204, a determination may be made that the object 204 is in the crosswalk 206.

Figure 6:
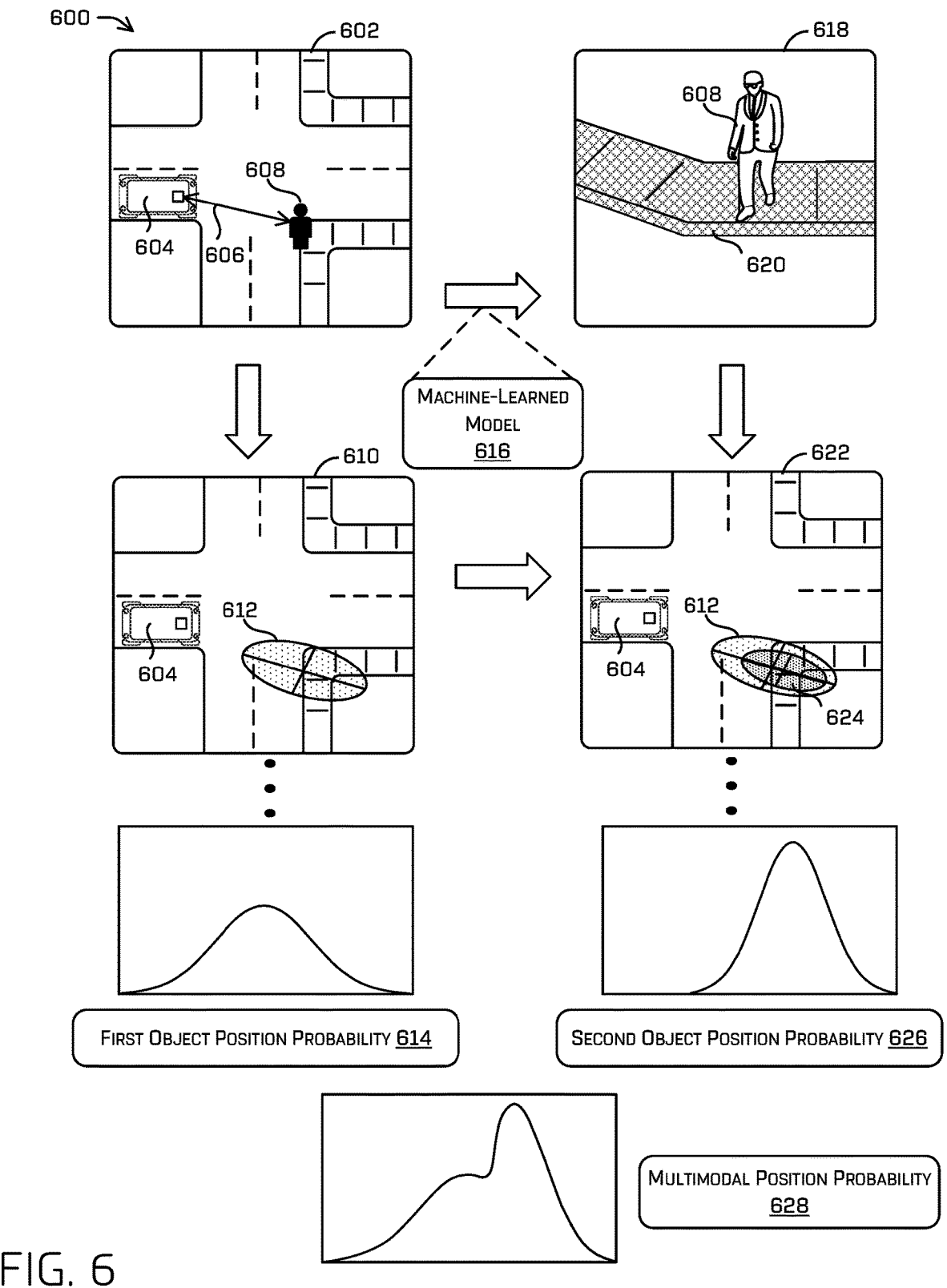
FIG. 6 is an illustration of using a machine-learned model to identify an environmental attribute which is used to update a depth estimate of an object, in accordance with examples of the disclosure.

FIG. 6 is an illustration 600 of using a machine-learned model to identify an environmental attribute which is used to update a depth estimate of an object, in accordance with examples of the disclosure.

An example 602 depicts a top-down view of a vehicle 604 traversing an environment, and an object 608 detected to be at a depth 606 from the vehicle 604 (e.g., similar to the example 104 of FIG. 1). The depth 606 may be an estimate of a probability of a location of the object 608 in the environment from the vehicle 604, such as based on a monocular depth estimate as described above in relation to FIG. 3. For instance, an example 610 depicts an ellipse 612 generally at the location of the object 608, where the ellipse 612 may correspond to potential locations of the object 608 in the environment (e.g., an uncertainty which may be output from such a machine learned depth estimate). A first object position probability 614 may correspond to a Gaussian or normal distribution of potential locations of the object 608 along the long axis of the ellipse 612. An x-axis of the first object position probability 614 may correspond to location or position along the long axis of the ellipse 612, while a y-axis of the first object position probability 614 may correspond to the probability of the object 608 being at the particular position or location.

An image depicting the object 608 and at least a portion of the environment surrounding the object 608 captured by the vehicle 604 may be input into a machine-learned model 616. The machine-learned model 616 may be configured to classify environmental attributes depicted in images, and may further be configured to output positions of objects relative to the environmental attributes (e.g., behind, in front of, next to, etc.) as described herein. For instance, an example 618 may correspond to an image of the object 608 as captured by the vehicle 604, along with an environmental attribute 620 identified by the machine-learned model 616. The machine-learned model 616 may also output an indication that the object 608 is on top of the sidewalk, behind the curb, or similar to provide additional information for refining the initial depth 606 from the vehicle 604 to the object 608. In some cases, the machine-learned model 616 may further determine additional information about the relative position of the object 608 and the environmental attribute 620, such as an estimated distance between the object 608 and the environmental attribute 620, an angle between the object 608 and the environmental attribute 620, and so forth which may be used to further refine the depth of the object 608. Furthermore, in some examples, map data may be input into the machine-learned model with an image of the object 608, such as in cases when an environmental attribute that may be useful to determine depth is occluded in the image.

An example 622 depicts the vehicle 604 and the ellipse 612 as described in relation to the example 610, and further depicts an ellipse 624 indicating a refined estimation of the potential locations of the object 608 in the environment from the ellipse 612. A second object position probability 626 may correspond to a Gaussian or normal distribution of potential locations of the object 608 along the axis of the ellipse 624. Similar to above, an x-axis of the second object position probability 626 may correspond to location or position along the long axis of the ellipse 624, while ay-axis of the second object position probability 626 may correspond to the probability of the object 608 being at the particular position or location. When the second object position probability 626 is compared to the first object position probability 614, the position or location of the object 608 having the highest probability has moved along the x-axis, while the probability of the object 608 being at the particular position or location is higher. Therefore, in this example, the location of the object 608 in the environment has a higher probability of being farther away from the vehicle 604 than in the initial depth 606 determined by the vehicle 604.

In some examples, the first object position probability 614 and the second object position probability 626 may be combined into a multimodal position probability 628. In general, a multimodal distribution has more than one mode (e.g., where a mode occurs above a threshold probability of a particular location). By combining the first object position probability 614 and second object position probability 626, the vehicle 604 may evaluate which of the position or location estimates is most likely for the object 608 (e.g., a maximum likelihood depth estimate), and then may use the most likely position or location estimate to calculate a revised depth estimate. In other examples, the first object position probability 614 and/or second object position probability 626 may be averaged (e.g., by a weighted average), or may be otherwise combined to determine a revised depth estimate.

Additionally, one or more of the first object position probability 614, the second object position probability 626, and/or the multimodal position probability 628 may be mapped into a three-dimensional position, such as voxel space, to provide the vehicle 604 with a three-dimensional picture of the surrounding environment. The vehicle 604 may then use the probability of the depth of the object 608 in voxel space in determining a probability of occupancy in a voxel grid, such as by combining the probability of occupancy with information from other sensor modalities such as lidar, radar, time of flight, and so forth. In this way, the vehicle 604 may develop a more complete and accurate understanding of its surroundings, enabling the vehicle 604 to proceed through the environment more safely and with better outcomes.

Figure 7:
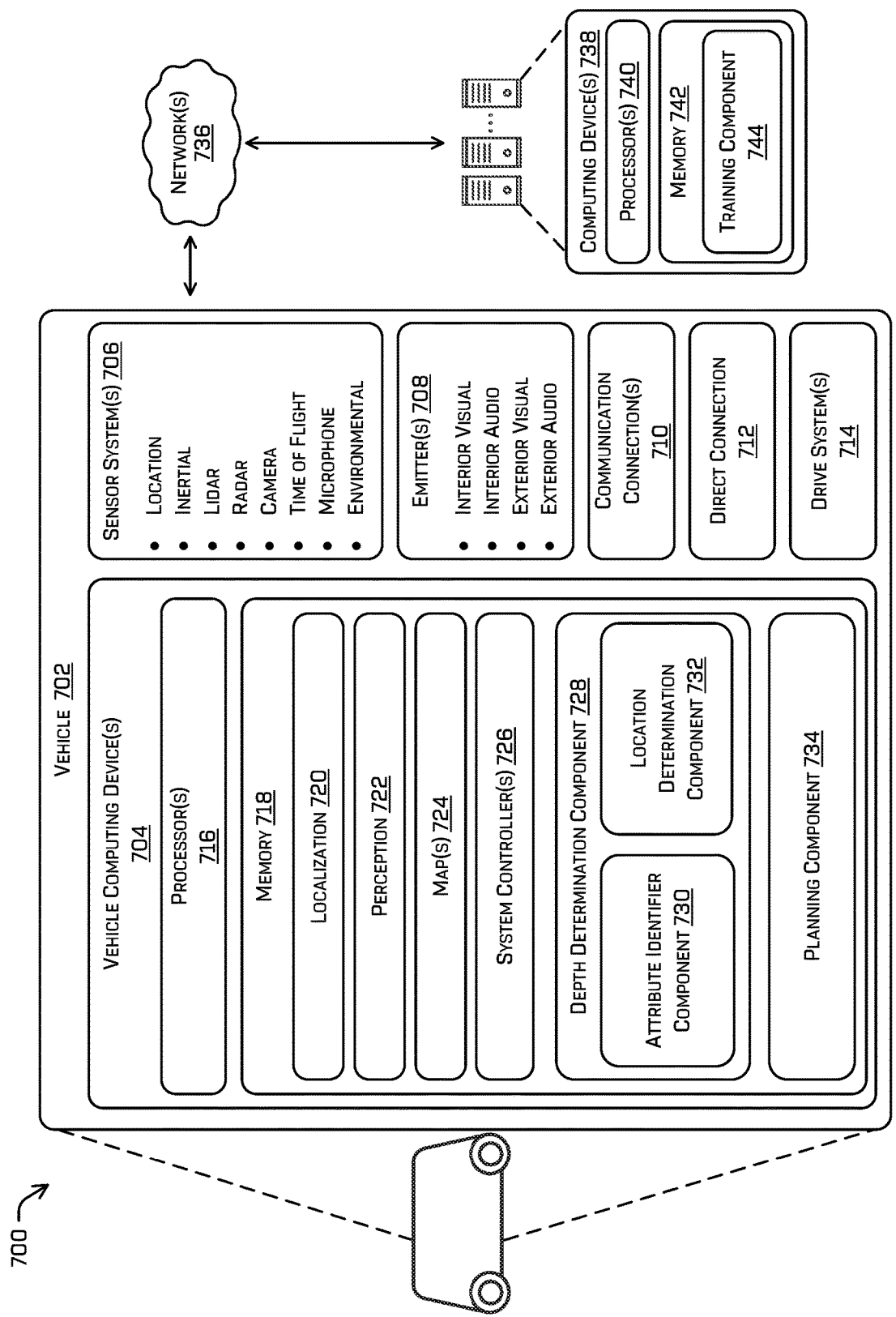
FIG. 7 depicts a block diagram of an example system for implementing the techniques described herein.

FIG. 7 depicts a block diagram of an example system 700 for implementing the techniques described herein. In at least one example, the system 700 can include a vehicle 702, such as an autonomous, semi-autonomous, or manually controlled vehicle.

The vehicle 702 can include vehicle computing device(s) 704, one or more sensor systems 706, one or more emitters 708, one or more communication connections 710, at least one direct connection 712, and one or more drive systems 714.

The vehicle computing device(s) 704 can include one or more processors 716 and memory 718 communicatively coupled with the one or more processors 716. In the illustrated example, the vehicle 702 is an autonomous vehicle; however, the vehicle 702 could be any other type of vehicle or robotic platform. In the illustrated example, the memory 718 of the vehicle computing device(s) 704 stores a localization component 720, a perception component 722, one or more maps 724, one or more system controllers 726, a depth determination component 728, an attribute identifier component 730, a location determination component 732, and a planning component 734. Though depicted in FIG. 7 as residing in the memory 718 for illustrative purposes, it is contemplated that the localization component 720, the perception component 722, the one or more maps 724, the one or more system controllers 726, the depth determination component 728, the attribute identifier component 730, the location determination component 732, and the planning component 734 can additionally, or alternatively, be accessible to the vehicle 702 (e.g., stored on, or otherwise accessible by, memory remote from the vehicle 702).

In at least one example, the localization component 720 can include functionality to receive data from the sensor system(s) 706 to determine a position and/or orientation of the vehicle 702 (e.g., one or more of an x-, y-, z-position, roll, pitch, or yaw). For example, the localization component 720 can include and/or request/receive a map of an environment and can continuously determine a location and/or orientation of the autonomous vehicle within the map. In some instances, the localization component 720 can utilize SLAM (simultaneous localization and mapping), CLAMS (calibration, localization and mapping, simultaneously), relative SLAM, bundle adjustment, non-linear least squares optimization, or the like to receive image data, lidar data, radar data, time of flight data, IMU data, GPS data, wheel encoder data, and the like to accurately determine a location of the autonomous vehicle. In some instances, the localization component 720 can provide data to various components of the vehicle 702 to determine an initial position of an autonomous vehicle for generating a trajectory, for determining to retrieve map data, and so forth, as discussed herein.

In some instances, the perception component 722 can include functionality to perform object detection, segmentation, and/or classification. In some examples, the perception component 722 can provide processed sensor data that indicates a presence of an entity or object that is proximate to the vehicle 702 and/or a classification of the entity as an entity type (e.g., car, wheel, pedestrian, cyclist, animal, building, tree, road surface, curb, sidewalk, stoplight, stop sign, lane marker, unknown, etc.). In additional or alternative examples, the perception component 722 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc.

In those examples in which perception component 722 performs detection, the perception component 722 may output detections of objects and/or associated environmental attributes proximate objects detected in the image. Such detections may comprise two-dimensional bounding boxes (which may subsequently be used to crop the image) and/or masks of the detected object. In some examples, such detection may utilize a machine learning approach (e.g., scale-invariant feature transform (SIFT), histogram of oriented gradients (HOG), etc.) followed by a support vector machine (SVM) to classify objects depicted in images received from a camera of the sensor system(s) 706. Alternatively or additionally, detection may utilize a deep learning approach based on a convolutional neural network (CNN) to classify objects depicted in images received from a camera of the sensor system(s) 706. In examples, the detection may utilize one or more of the object detection techniques (or others) to detect an object depicted in an image, and/or detect an environmental attribute (e.g., proximate the object) depicted in an image, according to the described techniques.

The memory 718 can further include one or more maps 724 that can be used by the vehicle 702 to navigate within the environment, and/or to determine locations of environmental attributes. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment, and can be loaded into working memory as needed. In at least one example, the one or more maps 724 can include at least one map (e.g., images and/or a mesh). In some examples, the vehicle 702 can be controlled based at least in part on the maps 724. That is, the maps 724 can be used in connection with the localization component 720, the perception component 722, the depth determination component 728, or the planning component 734 to determine a location of the vehicle 702, identify objects and/or environmental attributes in an environment, and/or generate routes and/or trajectories to navigate within an environment.

In some examples, the one or more maps 724 can be stored on a remote computing device(s) (such as the computing device(s) 738) accessible via network(s) 736. In some examples, multiple maps 724 can be stored based on, for example, a characteristic (e.g., type of entity, time of day, day of week, season of the year, etc.). Storing multiple maps 724 can have similar memory requirements, but increase the speed at which data in a map can be accessed. In some examples, the one or more maps 724 can store sizes or dimensions of objects associated with individual locations in an environment. For example, as the vehicle 702 traverses the environment and as maps representing an area proximate to the vehicle 702 are loaded into memory, one or more sizes or dimensions of objects associated with a location can be loaded into memory as well.

In general, the depth determination component 728 can estimate depth of objects in the environment surrounding the vehicle 702 and refine the depth estimates using locations of environmental attributes based on data provided by the sensor system(s) 706. In some instances, the depth determination component 728 can provide information generated by the attribute identifier component 730 and/or the location determination component 732 to the planning component 734 to determine when and/or how to control the vehicle 702 to traverse an environment. As discussed herein, the depth determination component 728 can receive image data, map data, lidar data, and the like to determine information about objects in an environment.

The attribute identifier component 730 can determine, from an image (or cropped image) of an object, a classification of an environmental attribute proximate the object, and in some cases, may also determine a position of the object relative to the environmental attribute. For example, the attribute identifier component 730 may utilize a machine-learned model trained to classify environmental attributes into categories such as a sidewalk, a bicycle lane, a crosswalk, or a lane of traffic, to name a few examples. In some examples, the attribute identifier component 730 may determine different classifications based on a particular object identified in an image, such as a first set of classifications for vehicles (e.g., lanes of oncoming traffic, lanes of traffic traveling in a same direction as the vehicle 702, parking spaces, driveways, etc.), a second set of classifications for pedestrians (e.g., sidewalks parallel to a direction of travel of the vehicle 702, sidewalks perpendicular to a direction of travel of the vehicle 702, crosswalks, lanes of traffic, etc.), a third set of classifications for two-wheeled vehicles such as bicycles, motorcycles, and/or scooters (e.g., bicycle lanes, sidewalks, lanes of traffic, etc.), and so forth. Further, the attribute identifier component 730 may refine the parameters of the machine-learned model to more accurately classify environmental attributes by comparing predicted environmental attributes provided by the machine-learned model to environmental attributes indicated in map data of the surrounding environment (e.g., provided by the maps 724). In some examples, the attribute identifier component 730 can provide information regarding the environmental attributes and/or the positions of objects relative to the environmental attributes to the planning component 734 to use in controlling the vehicle 702.

The location determination component 732 can determine, from the environmental attributes and in some cases the positions of objects relative to the environmental attributes, revised depth estimates for objects from the vehicle 702. For example, the location determination component may determine location probabilities of the object based at least in part on a known location of the environmental attribute proximate the object, and a position of the object relative to the environmental attribute. Further, the location determination component 732 may update a depth estimate provided by a neural network that predicts a depth estimate for individual pixels of an image of the environment. For instance, the location determination component 732 may utilize a multimodal distribution of probabilities of the location of the object provided from the first depth estimate and the depth estimate from the relationship of the object to the environmental attribute. The location determination component 732 in some examples may select, as the predicted location for the object, a location having the largest mode in the multimodal distribution as the predicted location for the object, although other examples are contemplated and/or described. The location determination component 732 may then use a known location of the vehicle (e.g., determined using SLAM or CLAMS, for instance) and the predicted location of the object to compute a depth of the object from the vehicle 702.

In general, the planning component 734 can determine a path for the vehicle 702 to follow to traverse the environment. For example, the planning component 734 can determine various routes and trajectories and various levels of detail. For example, the planning component 734 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 734 can generate an instruction for guiding the autonomous vehicle along at least a portion of the route from the first location to the second location. In at least one example, the planning component 734 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 702 to navigate.

In some instances, the planning component 734 can generate one or more trajectories for the vehicle 702 based at least in part on estimated depths of objects in the environment as determined from environmental attributes, as discussed herein. In some examples, the planning component 734 can use temporal logic, such as linear temporal logic and/or signal temporal logic, to evaluate one or more trajectories of the vehicle 702.

In at least one example, the vehicle computing device(s) 704 can include one or more system controllers 726, which can be configured to control steering, propulsion, braking, safety, emitters, communication, and other systems of the vehicle 702. The system controller(s) 726 can communicate with and/or control corresponding systems of the drive system(s) 714 and/or other components of the vehicle 702.

As can be understood, the components discussed herein (e.g., the localization component 720, the perception component 722, the one or more maps 724, the one or more system controllers 726, the depth determination component 728, the attribute identifier component 730, the location determination component 732, and the planning component 734) are described as divided for illustrative purposes. However, the operations performed by the various components can be combined or performed in any other component. By way of example, functions described in relation to the depth determination component 728, the attribute identifier component 730, and/or the location determination component 732 may be performed by the perception component 722 to reduce the amount of data transferred by the system.

In at least one example, the sensor system(s) 706 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 706 can include multiple instances of each of these or other types of sensors. For instance, the lidar sensors can include individual lidar sensors located at the corners, front, back, sides, and/or top of the vehicle 702. As another example, the camera sensors can include multiple cameras disposed at various locations about the exterior and/or interior of the vehicle 702. The sensor system(s) 706 can provide input to the vehicle computing device(s) 704. Additionally or alternatively, the sensor system(s) 706 can send sensor data, via the one or more networks 736, to the one or more computing device(s) at a particular frequency, after a lapse of a predetermined period of time, in near real-time, etc.

The vehicle 702 can also include one or more emitters 708 for emitting light and/or sound, as described above. The emitter(s) 708 in this example include interior audio and visual emitters to communicate with passengers of the vehicle 702. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 708 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 702 can also include one or more communication connection(s) 710 that enable communication between the vehicle 702 and one or more other local or remote computing device(s). For instance, the communication connection(s) 710 can facilitate communication with other local computing device(s) on the vehicle 702 and/or the drive system(s) 714. Also, the communication connection(s) 710 can allow the vehicle to communicate with other nearby computing device(s) (e.g., other nearby vehicles, traffic signals, etc.). The communication connection(s) 710 also enable the vehicle 702 to communicate with a remote teleoperations computing device or other remote services.

The communication connection(s) 710 can include physical and/or logical interfaces for connecting the vehicle computing device(s) 704 to another computing device or a network, such as network(s) 736. For example, the communications connection(s) 710 can enable Wi-Fi-based communication such as via frequencies defined by the IEEE 802.11 standards, short range wireless frequencies such as Bluetooth®, cellular communication (e.g., 2G, 3G, 7G, 7G LTE, 7G, etc.) or any suitable wired or wireless communications protocol that enables the respective computing device to interface with the other computing device(s).

In at least one example, the vehicle 702 can include one or more drive systems 714. In some examples, the vehicle 702 can have a single drive system 714. In at least one example, if the vehicle 702 has multiple drive systems 714, individual drive systems 714 can be positioned on opposite ends of the vehicle 702 (e.g., the front and the rear, etc.). In at least one example, the drive system(s) 714 can include one or more sensor systems to detect conditions of the drive system(s) 714 and/or the surroundings of the vehicle 702. By way of example and not limitation, the sensor system(s) can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive system, lidar sensors, radar sensors, etc. Some sensors, such as the wheel encoders can be unique to the drive system(s) 714. In some cases, the sensor system(s) on the drive system(s) 714 can overlap or supplement corresponding systems of the vehicle 702 (e.g., sensor system(s) 706).

The drive system(s) 714 can include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 714 can include a drive system controller which can receive and preprocess data from the sensor system(s) and to control operation of the various vehicle systems. In some examples, the drive system controller can include one or more processors and memory communicatively coupled with the one or more processors. The memory can store one or more components to perform various functionalities of the drive system(s) 714. Furthermore, the drive system(s) 714 also include one or more communication connection(s) that enable communication by the respective drive system with one or more other local or remote computing device(s).

In at least one example, the direct connection 712 can provide a physical interface to couple the one or more drive system(s) 714 with the body of the vehicle 702. For example, the direct connection 712 can allow the transfer of energy, fluids, air, data, etc. between the drive system(s) 714 and the vehicle. In some instances, the direct connection 712 can further releasably secure the drive system(s) 714 to the body of the vehicle 702.

In at least one example, the localization component 720, the perception component 722, the one or more maps 724, the one or more system controllers 726, the depth determination component 728, the attribute identifier component 730, the location determination component 732, and the planning component 734 can process sensor data, as described above, and can send their respective outputs, over the one or more networks 736, to one or more computing devices 738. In at least one example, the localization component 720, the perception component 722, the one or more maps 724, the one or more system controllers 726, the depth determination component 728, the attribute identifier component 730, the location determination component 732, and the planning component 734 can send their respective outputs to the computing device(s) 738 at a particular frequency, after a lapse of a predetermined period of time, in near real-time, etc.

In some examples, the vehicle 702 can send sensor data to one or more computing devices 738 via the network(s) 736. In some examples, the vehicle 702 can send raw sensor data to the computing device(s) 738. In other examples, the vehicle 702 can send processed sensor data and/or representations of sensor data to the computing device(s) 738. In some examples, the vehicle 702 can send sensor data to the computing device(s) 738 at a particular frequency, after a lapse of a predetermined period of time, in near real-time, etc. In some cases, the vehicle 702 can send sensor data (raw or processed) to the computing device(s) 738 as one or more log files.

The computing device(s) 738 can include processor(s) 740 and a memory 742 storing a training component 744.

In some instances, the training component 744 can include functionality to train one or more models to detect objects and/or environmental attributes, determine (classify or regress) objects and/or environmental attributes, determine positions of objects relative to environmental attributes, and the like. In some instances, the training component 744 can communicate information generated by the one or more models to the vehicle computing device(s) 704 to revise how to control the vehicle 702 in response to different situations.

For instance, aspects of some or all of the components discussed herein can include any models, algorithms, and/or machine learning algorithms. For example, in some instances, the components in the memory 742 (and the memory 718, discussed above) can be implemented as a neural network. In some examples, the training component 744 can utilize a neural network to generate and/or execute one or more models to improve various aspects of object trajectory estimation for use in trajectory planning of the vehicle 702.

As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc.

Additional examples of architectures include neural networks such as ResNet50, ResNet101, VGG, DenseNet, PointNet, and the like.

The processor(s) 716 of the vehicle 702 and the processor(s) 740 of the computing device(s) 738 can be any suitable processor capable of executing instructions to process data and perform operations as described herein. By way of example and not limitation, the processor(s) 716 and 740 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 718 and 742 are examples of non-transitory computer-readable media. The memory 718 and 742 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 7 is illustrated as a distributed system, in alternative examples, components of the vehicle 702 can be associated with the computing device(s) 738 and/or components of the computing device(s) 738 can be associated with the vehicle 702. That is, the vehicle 702 can perform one or more of the functions associated with the computing device(s) 738, and vice versa. Further, aspects of the depth determination component 728 and/or the planning component 734 can be performed on any of the devices discussed herein.

Figure 8:
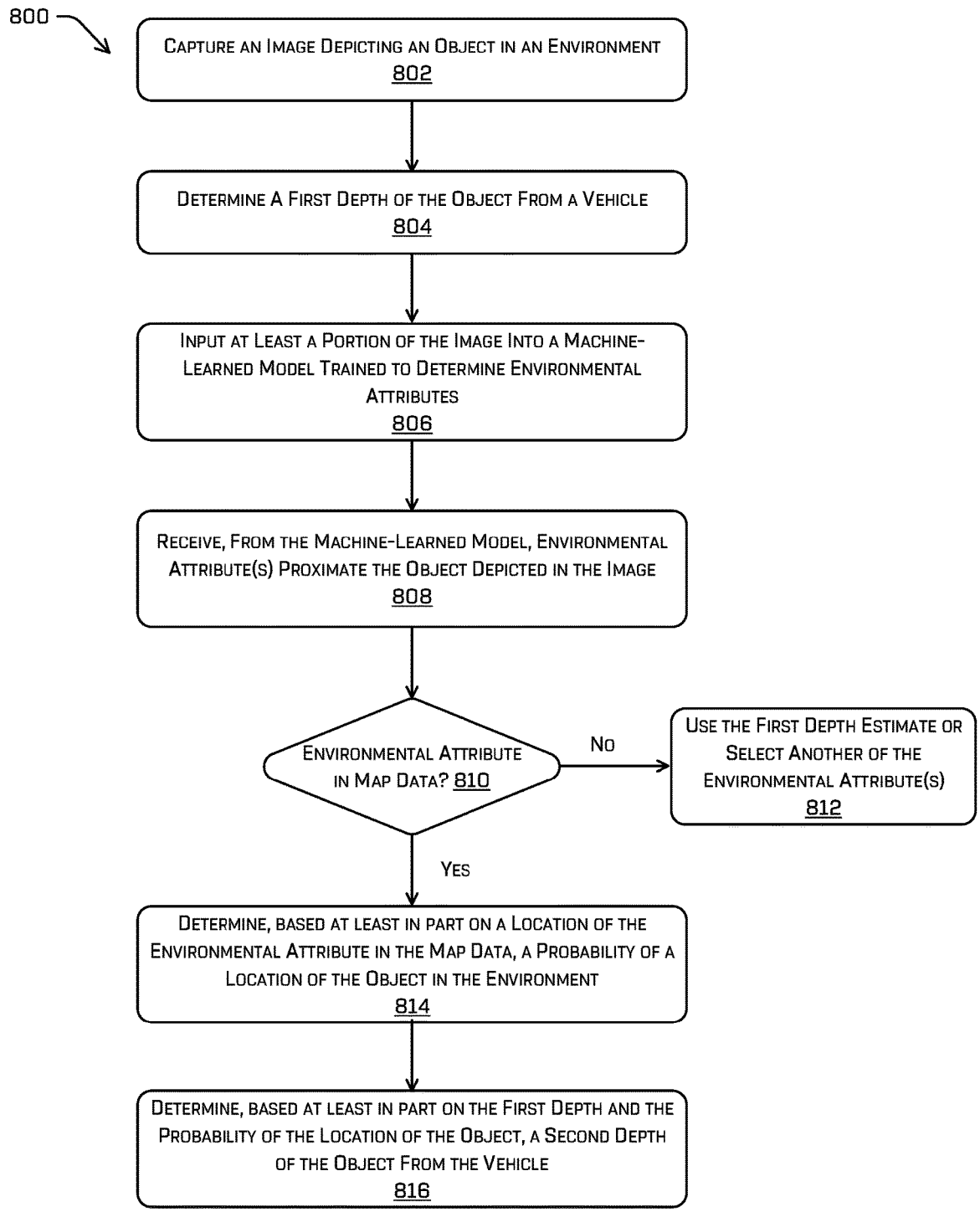
FIG. 8 depicts an example process for using a machine-learned model to identify an environmental attribute, determining a location of the environmental attribute from map data, and using the location of the environmental attribute to refine a determination of depth of the object from a vehicle, in accordance with examples of the disclosure.

FIG. 8 depicts an example process 800 for using a machine-learned model to identify an environmental attribute, determining a location of the environmental attribute from map data, and using the location of the environmental attribute to refine a depth of the object from a vehicle, in accordance with examples of the disclosure. For example, some or all of the process 800 can be performed by one or more components in FIG. 7, as described herein. For example, some or all of the process 800 can be performed by the vehicle computing device(s) 704, the computing device(s) 738, or any other computing device or combination of computing devices. Further, any of the operations described in the example process 800 may be executed in parallel, in a different order than depicted in the process 800, omitted, combined with other processes, and the like.

At operation 802, the process can include capturing an image depicting an object in an environment. For example, the image may be captured by a sensor, such as a camera, of a vehicle traversing the environment.

At operation 804, the process can include determining a first depth of the object from a vehicle. In some examples, the first depth may be determined by inputting the image into a neural network trained to predict depths of surfaces depicted in individual pixels in an image, and receiving a predicted depth at a location of the object from the neural network.

At operation 806, the process can include associating at least a portion of the image with an environmental attribute. In at least some examples, such an association may be performed by inputting at least a portion of the image into a machine-learned model trained to determine environmental attributes. For example, environmental attributes may be objects such as sidewalks, crosswalks, traffic lanes, bicycle lanes, and others as described herein and further considered. Environmental attributes, in some examples, may be generally permanent objects in the environment.

At operation 808, the process can include receiving, from the machine-learned model, environmental attribute(s) associated with the object depicted in the image. For instance, the environmental attribute(s) may be one or more of the environmental attributes which the machine-learned classifier is trained to detect. In some cases, the machine-learned model may also output a position of the object relative to the environmental attribute, such as to indicate that the object is on top of, under, next to, in front of, and/or behind the environmental attribute, to name a few examples. The relative location of the object to the environmental attribute may be represented as a vector, as coordinates, or other mechanism of conveying relative positions between entities when output by the machine-learned model.

At operation 810, a determination is made as to whether the environmental attribute is included in map data. In some cases, an environmental attribute may newly added to the environment, modified in some way, occluded, or otherwise unsuitable to be used to determine a depth of an object. In such a case, the process may proceed to operation 812, at which the first depth estimate is used to determine a depth of the object, or another of the environmental attributes is selected. For example, if new lane markers have been painted on a road that have not yet been added to map data, the process may select another environmental attribute, such as a sidewalk included in the map data, to refine the first depth estimate.

Otherwise, at operation 814, the process can include determining, based at least in part on a location of the environmental attribute in the map data, a probability of a location of the object in the environment. In some examples, the probability of the location of the object may be based on a multimodal distribution of the probability of the location of the object as determined by the first depth estimate, combined with the probability of the location of the object as determined by the location of the object relative to the environmental attribute.

At operation 816, the process can include determining, based at least in part on the first depth and the probability of the location of the object, a second depth of the object from the vehicle. For example, a highest mode of the multimodal distribution may be selected as the second depth of the object, refined from the first depth of the object. In some examples, the second depth of the object may be used to determine an uncertainty associated with the first depth of the object, such as by comparing a relative location of the object to the environmental attribute as described herein. The refined depth of the object may be used to control a vehicle, such as to traverse an environment to avoid a collision with the object based on the refined depth.

Example Clauses

A: A system comprising: one or more processors; and one or more computer-readable media storing instructions executable by the one or more processors, wherein the instructions, when executed, cause the system to perform operations comprising: receiving, from a sensor of an autonomous vehicle, an image depicting an object in an environment; determining a first depth of the object; inputting at least a portion of the image associated with the object into a machine-learned model trained to output an association of one or more environmental attributes with objects represented in images input into the machine-learned model; receiving, from the machine-learned model, an output indicative of an environmental attribute associated with the object; determining, based at least in part on the output and map data associated with the environmental attribute, a second depth associated with a location of the object in the environment; and determining, based at least in part on the first depth and the second depth associated with the location of the object in the environment, an estimated depth of the object.

B: The system of paragraph A, wherein the operations further comprise controlling the autonomous vehicle to traverse the environment based at least in part on the estimated depth of the object.

C: The system of paragraph A, wherein the first depth is based at least in part on a first distribution and the second depth is based at least in part on a second distribution.

D: The system of paragraph C, wherein the operations further comprise: combining the first distribution and the second distribution into a multimodal distribution associated with a depth of the object; and mapping the multimodal distribution associated with the depth to a three-dimensional position.

E: A method comprising: receiving an image depicting an object in an environment; determining, based at least in part on the image, a first distance to the object; inputting at least a portion of the image associated with the object into a machine-learned model; receiving, from the machine-learned model, an output indicative of an environmental attribute associated with the object; determining, based at least in part on the output and map data associated with the environmental attribute, a second distance to the object; and determining, based at least in part on the first distance and the second distance, a refined distance of the object.

F: The method of paragraph E, wherein the first distance of the object is based at least in part on a monocular depth estimation from the image.

G: The method of paragraph E, wherein determining the first distance to the object comprises: inputting the image into a neural network trained to predict depths of surfaces of the environment from images; and receiving predicted depths of the surfaces corresponding to pixels of the image, wherein the first distance is based at least in part on a predicted depth of the predicted depths associated with the object depicted in the image.

H: The method of paragraph E, further comprising determining a position of the object relative to the environmental attribute, wherein determining the second distance is further based on the position of the object relative to the environmental attribute.

I: The method of paragraph E, wherein the object is a first vehicle, and wherein the machine-learned model comprises a classifier trained to classify environmental attributes into one or more of: a first lane of oncoming traffic; a second lane of traffic shared by the first vehicle and a second vehicle; a third lane of traffic traveling in a same direction as the second vehicle; a parking space; or a driveway.

J: The method of paragraph E, wherein the object is a pedestrian, wherein the machine-learned model comprises a classifier trained to classify environmental attributes into one or more of: a first sidewalk parallel to a direction of travel of a vehicle; a second sidewalk perpendicular to the direction of travel of the vehicle; a corner; a crosswalk; or a lane of traffic.

K: The method of paragraph E, wherein the object is a two-wheeled vehicle, wherein the machine-learned model comprises a classifier trained to classify environmental attributes into one or more of: a bicycle lane; a corner; a sidewalk; or a lane of traffic.

L: One or more computer-readable media storing instructions that when executed by one or more processors perform operations comprising: determining a first depth of an object represented in an image captured by a sensor of a vehicle; inputting at least a portion of the image associated with the object into a machine-learned model; receiving, from the machine-learned model, an output indicative of an environmental attribute associated with the object; determining, based at least in part on the output indicative of the environmental attribute received from the machine-learned model and map data associated with the environmental attribute a second depth of the object; and determining, based at least in part on the first depth and the second depth, a refined depth of the object.

M: The one or more computer-readable media of paragraph L, wherein the first depth is associated with a first distribution and the second depth is associated with a second distribution.

N: The one or more computer-readable media of paragraph M, the operations further comprising: combining the first distribution and the second distribution into a multimodal distribution; and mapping the multimodal distribution to a three-dimensional position.

O: The one or more computer-readable media of paragraph M, the operations further comprising: combining first distribution and the second distribution into a multimodal distribution; and determining a maximum likelihood depth estimate based at least in part on the multimodal distribution.

P: The one or more computer-readable media of paragraph L, wherein the first depth of the object is based at least in part on a monocular depth estimation from the image.

Q: The one or more computer-readable media of paragraph P, wherein determining the first depth of the object comprises: inputting the image into a neural network trained to predict depths of surfaces of an environment from images; and receiving predicted depths of the surfaces corresponding to pixels of the image, wherein the monocular depth estimation is based at least in part on a predicted depth of the predicted depths associated with the object depicted in the image.

R: The one or more computer-readable media of paragraph L, the operations further comprising determining a position of the object relative to the environmental attribute, wherein determining an uncertainty associated with the first depth of the object is further based on the position of the object relative to the environmental attribute.

S: The one or more computer-readable media of paragraph L, wherein the machine-learned model comprises a classifier trained to classify environmental attributes into one or more of: a sidewalk; a bicycle lane; a corner; a traffic lane; or a crosswalk.

T: The one or more computer-readable media of paragraph L, the operations further comprising controlling the vehicle to traverse an environment based at least in part on the refined depth of the object.

While the example clauses described above are described with respect to one particular implementation, it should be understood that, in the context of this document, the content of the example clauses can also be implemented via a method, device, system, a computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While individual examples are described herein as having certain features or components, the features and components of the individual examples can be combined and used together. While the operations herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
    one or more processors; and
    one or more computer-readable media storing instructions executable by the one or more processors, wherein the instructions, when executed, cause the system to perform operations comprising:
        receiving, from a sensor, image data including an object in an environment;
        determining, based at least in part on the image data, a first depth of the object relative to the sensor;
        determining an indication of an environmental attribute in the environment;
        receiving map data associated with the environment, wherein the map data is stored in memory associated with the system and includes static information of the environment including a previously known location of the environmental attribute;
        determining, based at least in part on the indication of the environmental attribute in the environment and the map data including the previously known location of the environmental attribute in the environment, a second depth of the object relative to the sensor; and
        determining, based at least in part on the first depth and the second depth, a third depth of the object relative to the sensor.

2. The system of claim 1, wherein the first depth is based at least in part on a first distribution and the second depth is based at least in part on a second distribution.

3. The system of claim 2, wherein determining the third depth of the object relative to the sensor comprises:
    using the second depth for the third depth;
    combining the first distribution and the second distribution into a multimodal distribution, and determining the third depth based at least in part on the multimodal distribution;
    averaging the first depth and the second depth to obtain the third depth; or
    weighted averaging the first depth and the second depth based on a first probability of the first depth and a second probability of the second depth to obtain the third depth.

4. The system of claim 1, further comprising:
    determining a location of the environmental attribute in the image data,
    wherein determining the third depth of the object relative to the sensor is based at least in part on a first position of the object in the image relative to a second position of the environmental attribute in the image.

5. A method comprising:
receiving, from a sensor, image data including an object in an environment;
determining, based at least in part on the image data, a first depth of the object relative to the sensor;
determining an indication of an environmental attribute in the environment;
receiving map data associated with the environment, wherein the map data is stored in memory and includes static information of the environment including a previously known location of the environmental attribute;
determining, based at least in part on the indication of the environmental attribute in the environment and the map data including the previously known location of the environmental attribute in the environment, a second depth of the object relative to the sensor; and
determining, based at least in part on the first depth and the second depth, a third depth of the object relative to the sensor.

6. The method of claim 5, wherein the first depth of the object is based at least in part on a monocular depth estimation from the image data.

7. The method of claim 5, wherein determining the first depth to the object comprises:
inputting the image data into a neural network trained to predict depths of surfaces of the environment from images; and
receiving predicted depths of the surfaces corresponding to pixels of the image data,
wherein the first depth is based at least in part on a predicted depth of the predicted depths associated with the object depicted in the image data.

8. The method of claim 5, further comprising determining a position of the object relative to the environmental attribute, wherein determining the second depth is further based on the position of the object relative to the environmental attribute.

9. The method of claim 5, wherein the first depth is based at least in part on a first distribution and the second depth is based at least in part on a second distribution.

10. The method of claim 9, wherein determining the third depth comprises any one of:
using the second depth for the third depth;
combining the first distribution and the second distribution into a multimodal distribution, and determining the third depth based at least in part on the multimodal distribution;
averaging the first depth and the second depth to obtain the third depth; or
weighted averaging the first depth and the second depth based on a first probability of the first depth and a second probability of the second depth to obtain the third depth.

11. The method of claim 5, wherein the static information comprises at least one of:
a bicycle lane;
a corner;
a crosswalk;
a fence;
grass or other ground cover material;
a sign;
a sidewalk; or
a lane marker of traffic.

12. The method of claim 5, further comprising:
determining a location of the environmental attribute in the image data,
wherein determining the third depth of the object relative to the sensor is based at least in part on a first position of the object in the image relative to a second position of the environmental attribute in the image.

13. One or more non-transitory computer-readable media storing instructions that when executed by one or more processors perform operations comprising:
receiving, from a sensor, image data including an object in an environment;
determining, based at least in part on the image data, a first depth of the object relative to the sensor;
determining an indication of an environmental attribute in the environment;
receiving map data associated with the environment, wherein the map data is stored in memory and includes static information of the environment including a previously known location of the environmental attribute;
determining, based at least in part on the indication of the environmental attribute in the environment and the map data including the previously known location of the environmental attribute in the environment, a second depth of the object relative to the sensor; and
determining, based at least in part on the first depth and the second depth, a third depth of the object relative to the sensor.

14. The one or more non-transitory computer-readable media of claim 13, wherein the first depth is associated with a first distribution and the second depth is associated with a second distribution.

15. The one or more non-transitory computer-readable media of claim 14, wherein determining the third depth of the object relative to the sensor comprises:
using the second depth for the third depth;
combining the first distribution and the second distribution into a multimodal distribution, and determining the third depth based at least in part on the multimodal distribution;
averaging the first depth and the second depth to obtain the third depth; or
weighted averaging the first depth and the second depth based on a first probability of the first depth and a second probability of the second depth to obtain the third depth.

16. The one or more non-transitory computer-readable media of claim 13, wherein the first depth of the object is based at least in part on a monocular depth estimation from the image data.

17. The one or more non-transitory computer-readable media of claim 16, wherein determining the first depth of the object comprises:
inputting the image data into a neural network trained to predict depths of surfaces of the environment from image data; and
receiving predicted depths of the surfaces corresponding to pixels of the image data,
wherein the monocular depth estimation is based at least in part on a predicted depth of the predicted depths associated with the object depicted in the image data.

18. The one or more non-transitory computer-readable media of claim 13, the operations further comprising determining a position of the object relative to the environmental attribute, wherein determining the second depth is further based on the position of the object relative to the environmental attribute.

19. The one or more non-transitory computer-readable media of claim 13, wherein the static information comprises at least one of:
  a bicycle lane;
  a corner;
  a crosswalk;
  a fence;
  grass or other ground cover material;
  a sign;
  a sidewalk; or
  a lane marker of traffic.

20. The one or more non-transitory computer-readable media of claim 13, further comprising:
  determining a location of the environmental attribute in the image data,
  wherein determining the third depth of the object relative to the sensor is based at least in part on a first position of the object in the image relative to a second position of the environmental attribute in the image.

* * * * *